H. V. WELCH.
APPARATUS FOR MAKING SULFURIC ACID.
APPLICATION FILED OCT. 1, 1918.
1,328,552.
Patented Jan. 20, 1920.
2 SHEETS—SHEET 1.
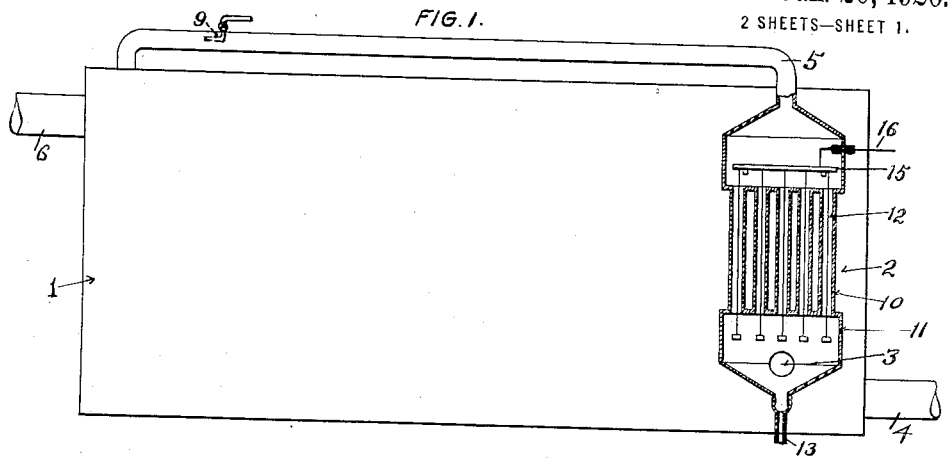
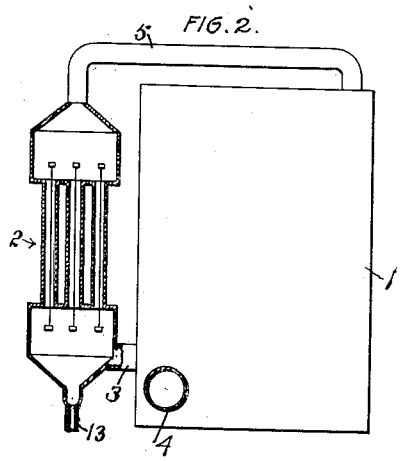
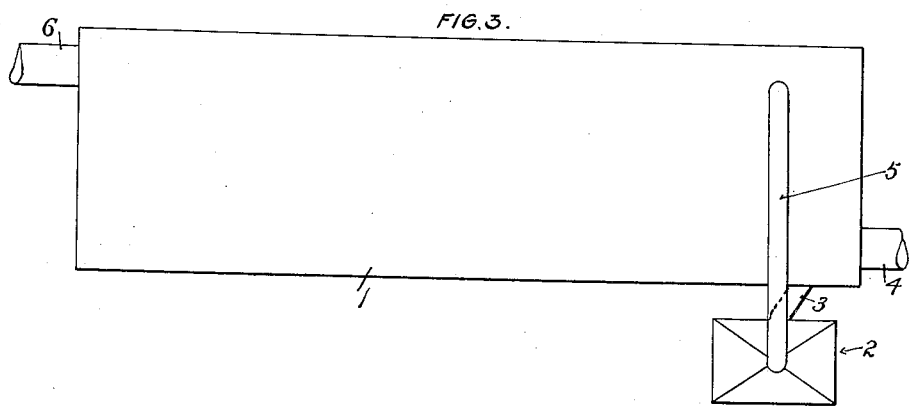
INVENTOR
Harry V. Welch
BY Arthur P. Knight
ATTORNEY H. V. WELCH.
APPARATUS FOR MAKING SULFURIC ACID.
APPLICATION FILED OCT. 1, 1918.
1,328,552.  Patented Jan. 20, 1920.
2 SHEETS—SHEET 2.
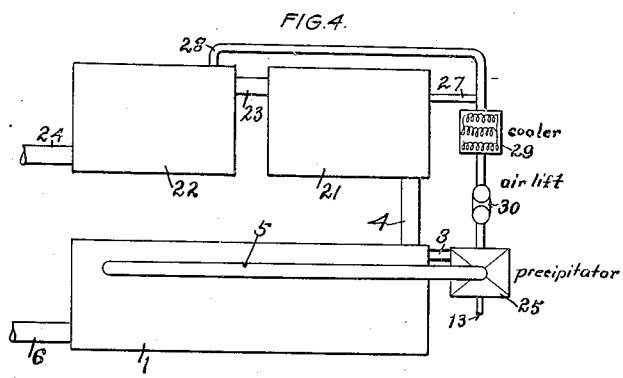
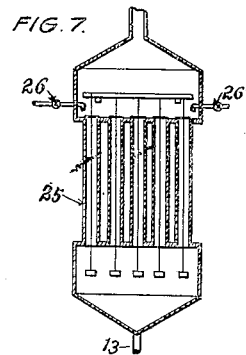
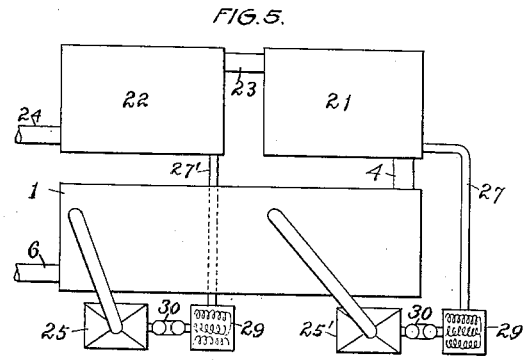
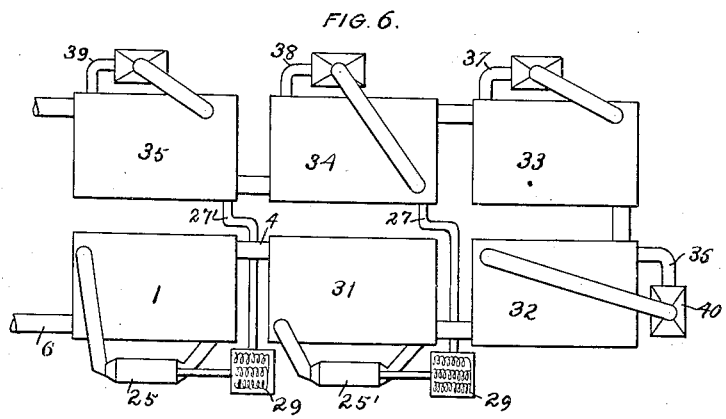
INVENTOR
*Harry V. Welch*
BY *Arthur P. Knight*
ATTORNEY

UNITED STATES PATENT OFFICE.

HARRY V. WELCH, OF LOS ANGELES, CALIFORNIA, ASSIGNOR TO INTERNATIONAL PRECIPITATION COMPANY, OF LOS ANGELES, CALIFORNIA, A CORPORATION OF CALIFORNIA.

APPARATUS FOR MAKING SULFURIC ACID.

1,328,552.  Specification of Letters Patent.  Patented Jan. 20, 1920.

Application filed October 1, 1918. Serial No. 256,379.

*To all whom it may concern:*

Be it known that I, HARRY V. WELCH, a citizen of the United States, residing at Los Angeles, in the county of Los Angeles and State of California, have invented new and useful Improvements in Apparatus for Making Sulfuric Acid, of which the following is a specification.

This invention relates to the production of sulfuric acid by the chamber process wherein gases containing sulfur dioxid and oxids of nitrogen are subjected to heat and humidification under suitable conditions for producing sulfuric acid. Such processes are generally carried out in a series of lead chambers and it has been found that in practice such chambers must be of large size and capacity in order to produce sulfuric acid on a commercial scale.

An important object of the present invention is to increase the capacity of a lead chamber system of given size by increasing the efficiency and rapidity of the conversion in one or more of the chambers by providing means for removing end products of reactions which tend to inhibit or retard the reactions by improving the distribution of the humidifying agents; by circulating the gases in the chambers so as to avoid the formation or quiescent regions and by cooling the gases so as to maintain the same at or near the optimum temperature for the reactions involved.

An object of the invention is to provide means for increasing the concentration of acid produced at the later stages of the operation so as to provide an acid of suitable strength for feeding to the Glover towers without requiring the production of an extra strong acid for mixing with the weaker acid in order to produce acid of the required strength for the purpose stated.

In explanation of the above statement of the objects of the invention, it may be pointed out, first, that in the front chambers, a mist concentration is produced which provides an inhibitating influence reducing materially the velocity of further acid formation, and secondly, a temperature rise is produced by the heat release in rapid chemical reactions involved which tend to raise the reacting constituents above the optimum reaction temperature.

The rear chambers as distinguished from the first, or, in special cases, the first and second, are not appreciably influenced by the latter of the two considerations mentioned above, but the former still persists and is of marked influence in inhibitating the completion of the reaction. It is common practice to operate the rear chambers for the production of a weaker grade acid than that produced in the front chambers, for the purpose of decomposing to the maximum possible extent, the mist particles of nitrosyl sulfuric acid existing therein according to the following reaction:

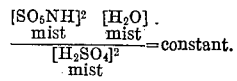
$$\frac{[SO_5NH]^2 \ [H_2O]}{\underset{\text{mist}}{[H_2SO_4]^2}} = \text{constant.}$$

Since the entire acid production of a desired concentration from all chambers is mixed preceding its transference to the Glover tower top, the production of weaker acid in the rear chambers must be compensated for by the production of acid in the front chambers of higher concentration than that passing to the Glover tower.

For overcoming the above stated difficulties and increasing the rapidity and efficiency of the operation in one or more of the chambers, I provide in connection with such chambers, or chamber, an electrical precipitator connected to receive the gases from such chamber, or chambers, at a point of maximum mist concentration and adapted to cool the gases and remove mist therefrom and connected to deliver the gases at a point of such chamber, or chambers, where the mist concentration is a minimum.

My invention also provides means for drawing off relatively weak acid from one or more of the later chambers of the series and returning such acid to one or more of the earlier chambers so as to strengthen the acid by contact with the reacting substances therein preparatory to delivering the resultant concentrated acid to the Glover tower.

The accompanying drawings illustrate embodiments of my invention and referring thereto:

Figure 1 is a side elevation, partly in section, and

Fig. 2 is an end view, of one form of the apparatus;

Fig. 3 is a side elevation of another form of the apparatus;

Figs. 4, 5 and 6 are plan views showing different arrangements and connections of a series of reaction chambers provided with my invention.

Fig. 7 is a vertical section of a form of electrical precipitator adapted for use in the installations shown in Figs. 4, 5 and 6.

Referring to Figs. 1 and 2, my invention is therein shown as applied in connection with a lead chamber 1, which may constitute any one of the chambers used in the ordinary chamber process of making sulfuric acid. An electrical precipitator 2 has its inlet pipe or conduit 3 connected to receive the gas from a part of the chamber 1 where there is a maximum concentration of mist, for example, near the outlet 4 of chamber 1, and said precipitator having its outlet pipe or conduit 5 connected with a part of the chamber 1 where there is minimum mist concentration, for example, adjacent to inlet 6 leading to the chamber 1 from a preceding chamber or from the Glover tower, as the case may be. Suitable means are provided in these connections for maintaining circulation of the gases therethrough and for this purpose a steam jet or water spray indicated at 9, or a fan, may be provided in the connecting pipe 5. In addition the steam jet or water spray provides the moisture in the form of mist, which may be required and the use of a water spray rather than a steam jet will permit of considerable additional cooling of the gases.

The electrical precipitator 2 may be of any suitable type provided with flues through which the gases are caused to flow and with electrodes for subjecting the gases to the action of an electrical field in passing through said flues so as to cause precipitation of suspended mist from the gases. The form of precipitator shown in Fig. 1 comprises vertical flues 10 connected at their lower ends to a header 11 communicating with the conduit 3 aforesaid, said flues 10 constituting collecting electrodes and being grounded; and the said precipitator further comprises discharge electrodes formed as fine wires 12, or otherwise, so as to facilitate electrical discharge therefrom and extending in their respective tubes 10 and hung from an insulated support 15 which is connected to a wire 16, leading to any suitable series of high potential unidirectional current, for example, in the manner disclosed in patent to F. G. Cottrell, dated August 11th, 1908, No. 895,729. Any other form of electrical precipitator may, however, be used and such precipitator may be arranged for either vertical or horizontal flow of the gases, as may be most desirable in any particular case. In any case, however, the precipitator should be of such construction as to withstand the action of the corrosive gases and, for this purpose, the collecting electrodes and flues of the precipitator and the connecting conduits therefor may be lead lined or they may be formed of tile, or similar material, it being understood that the precipitated mist will afford sufficient conductivity in case the said parts are made of non-conducting material. The discharge electrodes may be made of nichrome, lead covered wire, or other acid resistant material. Precipitator 2 is provided with outlet pipe or conduit 13 for drawing off the precipitated mist.

In the operation of this embodiment of my invention, the gases are withdrawn from the lower part of the lead chamber and near the exit are passed through the electrical precipitator wherein the fume and mist present in the gases is precipitated and the clean gases are then returned to the chamber 1 near the entrance point for the gases. The electrical precipitator also serves as a cooling agent for the gas and by thus circulating the gases in a local cycle, between the lead chamber 1 and the electrical precipitator and cooler 2, the concentration of mist in the gases may be reduced to and maintained at an amount compatible with rapid conversion of $SO_2$ to $SO_3$ by the catalytic action of the oxids of nitrogen present in the gases, the inhibiting of the acid mist end product being reduced to any desired extent in this manner. Moreover, by the cooling action in the electrical precipitator and the connections therefor, the heat, which is continually generated in the lead chamber 1 by the reactions taking place therein, may be withdrawn from the gases in the electrical precipitator and cooler 2 so that the gases in the chamber 1 may be maintained at or near the optimum temperature for the desired reactions.

As shown in Fig. 3, the inlet and outlet connections 3 and 5 of the electrical precipitator may both be made near one end of the lead chamber 1 but at the lower and upper parts thereof, respectively.

A more complete embodiment of my invention is illustrated in Fig. 4. Chamber 1, in this case, being assumed to be one of the first chambers of a series in a lead chamber installation and being followed by chambers 21 and 22, said chambers 1, 21 and 22 being connected in series by connections 4, 23 and 24. Chamber 1 is shown as provided with an electrical precipitator 25, said precipitator being similar to the precipitator above described but being provided, in addition, as shown in Fig. 7, with means indicated at 26 for supplying liquid, preferably dilute sulfuric acid, to the collecting electrodes for receiving the precipitated material and thereby serving to produce greater concentration in such dilute sulfuric acid. The dilute sulfuric acid used for this purpose may be supplied through connections 27 and 28 from one or both of the chambers 21 and 22, a suitable cooler 29 being provided, if necessary, for cooling this dilute acid before it is supplied to the electrical precipitator. Suitable means, such as an air lift indicated at 30, may be provided for pumping the dilute sulfuric acid from the bottoms of the chambers 21 and 22 to the top of the electrical precipitator 25. The operation of this form of my invention is similar to that above described with the addition that the dilute sulfuric acid applied in this manner aids in cooling the gases and at the same time is enriched by precipitation of the sulfuric acid mist thereinto so that the dilute acid produced in the later chambers of the series may in this manner be brought up to the required concentration for feeding to the Glover tower. The outlet pipe 13 of the electrical precipitator may, in this case, lead to a sump or tank from which it may be pumped to the Glover tower by suitable means.

The embodiment of my invention shown in Fig. 5 is similar to that shown in Fig. 4 with the exception that, in this case, the first lead chamber 1 is provided with a plurality of electrical precipitators 25 and 25' supplied with dilute acid from the chambers 21 and 22, respectively, for connections indicated at 27 and 27'. The operation being otherwise as above described.

The circulating connections for the two precipitators 25 and 25' are connected to different portions of the chamber 1 so that local circulation is provided for such different portions.

As shown in Fig. 5, my invention may be applied to a complete series of lead chambers 1, 31, 32, 33, 34 and 35. Chambers 1 and 31 being shown as provided with electrical precipitators 25 and 25' supplied with dilute acid from the bottom of chambers 34 and 35 and the respective chambers 32 to 35, inclusive, being each provided with local circulating connections 36, 37, 38 and 39 including, respectively, electrical precipitators 40, 41, 42 and 43, which may be of the type shown in Fig. 3, or of any other suitable type. The operation of this form of my invention is the same as that of the apparatus shown in Fig. 4 with the additional effect of local circulation in the later chambers of the series and accompanied by removal of the acid mist by cooling action in each of said local circulations.

It will be understood that in each of the above described forms of the invention means are provided in the circulation connections, for example, as shown at 9 in Fig. 1, to produce circulation of the gases through the precipitator and the other apparatus.

What I claim is:

1. In a chamber acid plant an electrical precipitator having an inlet connection to a chamber of said plant and having an outlet connection to the same chamber at a point remote from said inlet connection whereby the gases passing through the said chamber are circulated in a local circulation through the electrical precipitator.

2. In combination with a chamber of an acid plant an electrical precipitator connected to receive gases from near the outlet of the chamber and to deliver the gases from which mist has been removed by electrical precipitation to the same chamber near the inlet thereof.

3. In combination with a chamber of an acid plant an electrical precipitator connected to receive gases from the lower part of said chamber and to deliver the gases from which sulfuric acid mist has been removed by electrical precipitation to the upper part of said chamber.

4. In a chamber acid plant an electrical precipitator having its inlet and outlet connected to said chamber so as to circulate the gases in a local circulation through said chamber and to remove sulfuric acid mist from such gases, said electrical precipitator being provided with means for maintaining a descending film of dilute acid in contact with the gases passing therethrough.

5. In a chamber acid plant, a series of chambers, means for withdrawing dilute acid from the later chambers of the series, an electrical precipitator connected to receive gases from a preceding chamber of the series and to discharge the gases from which mist has been removed by electrical precipitation to the said preceding chamber, and means for supplying the dilute acid withdrawn from the aforesaid chamber to the electrical precipitator so as to cause said dilute acid to pass in contact with the gases in said precipitator and to receive precipitated acid mist for increasing the strength of said dilute acid.

6. In an apparatus according to claim 5 a connection from said electrical precipitator to the Glover tower of the plant for supplying the stronger acid so precipitated to the Glover tower.

7. An apparatus according to claim 5 wherein a cooler is provided for cooling the dilute acid before it is supplied to the electrical precipitator.

In testimony whereof I have hereunto subscribed by name this 18th day of September 1918.

HARRY V. WELCH.